US010516850B2

(12) United States Patent
Salfati et al.

(10) Patent No.: US 10,516,850 B2
(45) Date of Patent: Dec. 24, 2019

(54) METHOD AND SYSTEM FOR RECALLING AND REPLAYING CONTENT DURING A COMMUNICATIONS SESSION

(71) Applicant: Vonage Business Inc., Atlanta, GA (US)

(72) Inventors: Roni Salfati, Hod Hasharon (IL); Itay Bianco, Tel-Aviv (IL)

(73) Assignee: Vonage Business Inc., Atlanta, GA (US)

( * ) Notice: Subject to any disclaimer, the term of this patent is extended or adjusted under 35 U.S.C. 154(b) by 476 days.

(21) Appl. No.: 14/090,505

(22) Filed: Nov. 26, 2013

(65) Prior Publication Data

US 2015/0145945 A1    May 28, 2015

(51) Int. Cl.
*H04N 7/14* (2006.01)
*H04N 5/76* (2006.01)
*H04N 7/15* (2006.01)

(52) U.S. Cl.
CPC .............. *H04N 7/147* (2013.01); *H04N 5/76* (2013.01); *H04N 7/155* (2013.01)

(58) Field of Classification Search
USPC ...................................................... 348/14.06
See application file for complete search history.

(56) References Cited

U.S. PATENT DOCUMENTS

| | | | | |
|---|---|---|---|---|
| 7,567,908 B2* | 7/2009 | Bodin | ............... | H04L 29/06027 381/121 |
| 7,679,637 B1* | 3/2010 | Kohler | ................ | H04L 12/1827 348/14.01 |
| 8,108,541 B2* | 1/2012 | Shamilian | ........ | H04N 21/26616 709/230 |
| 2007/0133437 A1* | 6/2007 | Wengrovitz | ............ | H04M 3/56 370/260 |
| 2013/0339431 A1* | 12/2013 | Yannakopoulos | ........................... | H04L 12/1827 709/204 |
| 2014/0198173 A1* | 7/2014 | Willig | ...................... | H04N 7/15 348/14.03 |
| 2015/0092009 A1* | 4/2015 | DeLuca | ................... | H04N 7/15 348/14.08 |

* cited by examiner

*Primary Examiner* — Amal S Zenati
(74) *Attorney, Agent, or Firm* — Moser Taboada; Joseph Pagnotta

(57) ABSTRACT

Methods and apparatus for recalling and replaying content during a communications session are provided herein. In some embodiments, methods for replaying content during a communications session may comprise detecting a real-time communications session between two or more participant devices, storing content of the communications session transmitted between the two or more participant devices as the real-time communications session persists, receiving a control request from a first participant device of the two or more participants devices to replay a portion of the content; and transmitting the portion of the content to at least one of the participant devices as the real-time communications session persists.

19 Claims, 5 Drawing Sheets

METHOD AND SYSTEM FOR RECALLING AND REPLAYING CONTENT DURING A COMMUNICATIONS SESSION

BACKGROUND

Field

Embodiments of the present invention generally relate to a method and system for recalling and replaying content during a communications session.

Description of the Related Art

Oftentimes during a video or audio call or conference call between two or more participants, a conference participant may wish to demonstrate a concept, for example, by playing a video, or drawing figures on a whiteboard, so that other conference participants may gain a better understanding of the discussion. If these figures or the demonstration needs to be referred back to later in the conference call, there is no easy way to replay the demonstration. In other instances, conference participants may have missed an important point of discussion, and are looking to review the missed material. However, there is no easy way to rewind a live teleconference session to review the missed material while still maintaining the teleconference session.

Therefore there is a need in the art for recalling and replaying portions of content during a communications session.

SUMMARY

Methods and apparatus for recalling and replaying content during a communications session are provided herein. In some embodiments, methods for replaying content during a communications session may comprise detecting a real-time communications session between two or more participant devices, storing content of the communications session transmitted between the two or more participant devices as the real-time communications session persists, receiving a control request from a first participant device of the two or more participants devices to replay a portion of the content; and transmitting the portion of the content to at least one of the participant devices as the real-time communications session persists.

A system for recalling and replaying content during a communications session is further provided herein. In some embodiments, a system for recalling and replaying content comprises a media server configured to record broadcasted content from two or more participant devices during a communications session, the media server comprising a content recording processor configured to record the content to one of a remote storage or a local storage and configured to transmit the content to at least one of the two or more participant devices and a content request processor configured to receive a control request from a first participant device comprising a request to replay a portion of the communications session and configured to instruct the content recording processor to deliver the content to at least one of the participant devices.

Another method for recalling and replaying content during a communication is further provided herein. In some embodiments, the method comprises displaying live broadcasted content from one or more participant devices of a communications session, transmitting a control request to recall a portion of the broadcasted content from one of the participant devices and displaying the portion of the broadcasted content based on the control request synchronously while displaying the live broadcasted content during the communications session.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
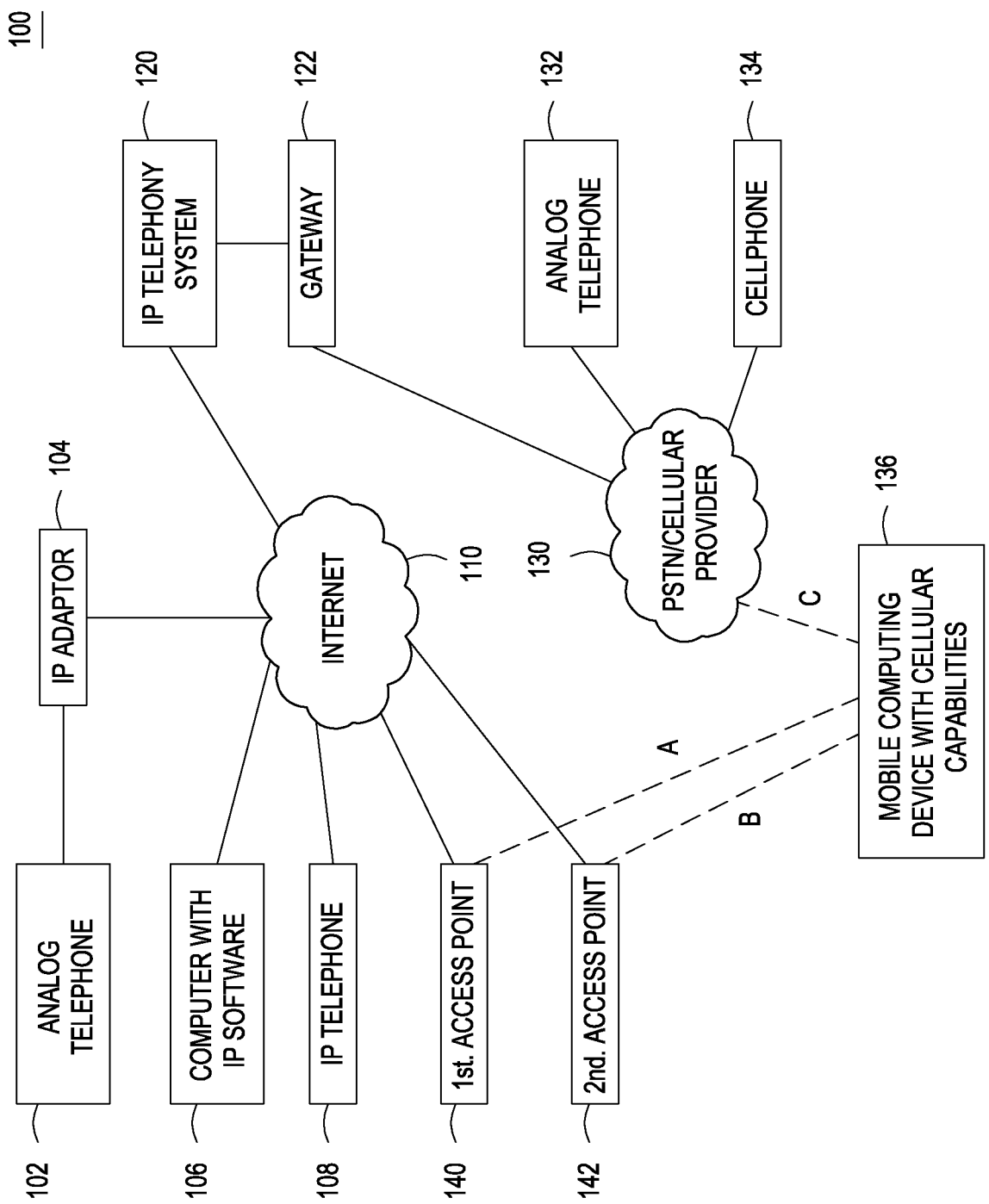
FIG. 1 illustrates a communications environment to facilitate IP enhanced communications in accordance with exemplary embodiments of the present invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to a method and system for recalling and replaying content during a communications session. In exemplary embodiments, each of the participants of an audio or video call may rewind and replay particular parts of the call audio and/or video, during the call session.

In the following description, the terms VOIP system, VOIP telephony system, IP system and IP telephony system are all intended to refer to a system that connects callers and that delivers data, text and video communications using Internet protocol data communications.

As illustrated in FIG. 1, a communications environment 100 is provided to facilitate IP enhanced communications. An IP telephony system 120 enables connection of telephone calls between its own customers and other participants via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a publicly switched telephone network (PSTN) 130 via a gateway 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third participant.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize the data channel of a cellular telephone system to access the Internet 110.

Alternatively, a customer could utilize an analog telephone 102 which is connected to the Internet 110 via a telephone adapter 104. The telephone adapter 104 converts analog signals from the telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may be provisioned by the IP telephony system 120.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a telephone adaptor 104 that is connected to one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third participant using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third participant using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone and an IP telephone.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the APPLE iPhone™, that includes both cellular telephone capabilities and a wireless data transceiver that can establish a wireless data connection to a data network. Such a mobile computing device could run appropriate application software to conduct VOIP telephone calls via a wireless data connection. Thus, a mobile computing device, such as an APPLE iPhone™, a RIM BLACKBERRY or a comparable device running GOOGLE's ANDROID operating system could be a mobile telephony device.

In still other instances, a mobile telephony device may be a device that is not traditionally used as a telephony device, but which includes a wireless data transceiver that can establish a wireless data connection to a data network. Examples of such devices include the APPLE iPod Touch™ and the iPad™. Such a device may act as a mobile telephony device once it is configured with appropriate application software.

FIG. 1 illustrates that a mobile computing device with cellular capabilities 136 is capable of establishing a first wireless data connection A with a first wireless access point 140, such as a WIFI or WIMAX router. The first wireless access point 140 is coupled to the Internet 110. Thus, the mobile computing device 136 can establish a VOIP telephone call with the IP telephony system 120 via a path through the Internet 110 and the first wireless access point 140.

FIG. 1 also illustrates that the mobile computing device 136 can establish a second wireless data connection B with a second wireless access point 142 that is also coupled to the Internet 110. Further, the mobile computing device 136 can establish a third wireless data connection C via a data channel provided by a cellular service provider 130 using its cellular telephone capabilities. The mobile computing device 136 could also establish a VOIP telephone call with the IP telephony system 120 via the second wireless connection B or the third wireless connection C.

Although not illustrated in FIG. 1, the mobile computing device 136 may be capable of establishing a wireless data connection to a data network, such as the Internet 110, via alternate means. For example, the mobile computing device 136 might link to some other type of wireless interface using an alternate communication protocol, such as the WIMAX standard.

Figure 2:
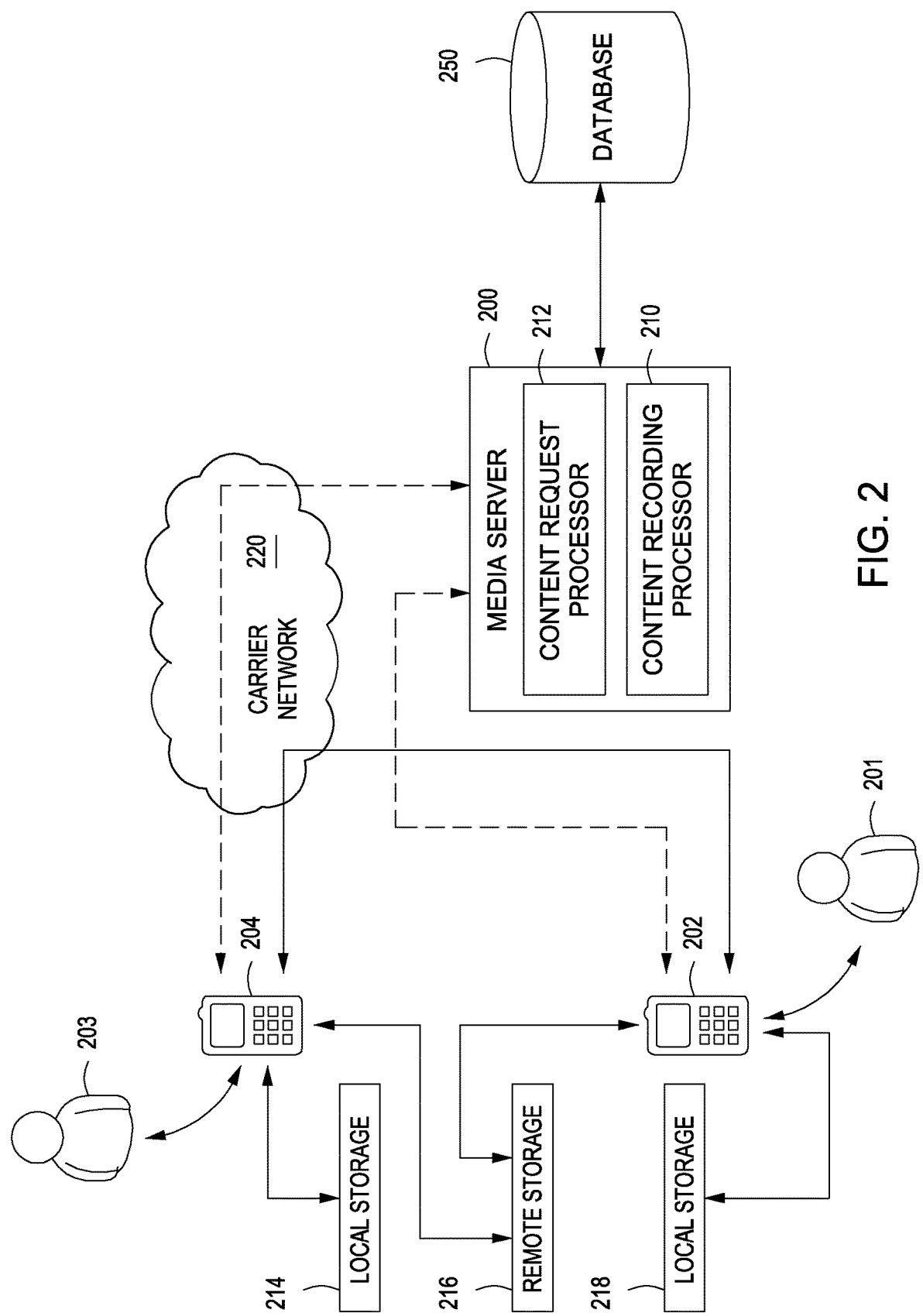
FIG. 2 is functional block diagram of a media server in accordance with exemplary embodiments of the present invention.

FIG. 2 is functional block diagram of a media server 200 in accordance with exemplary embodiments of the present invention. Teleconference participant 201 and participant 203 are engaged in a telephone call, for example, an audio call, a video call, or a video-conferencing call with other participants via carrier network 220, such as the internet 110 or the PSTN/cellular provider 130. Participant 201 is using device 202 and participant 203 is using device 204 to communicate. Those of ordinary skill in the art will recognize that a variety of devices could be used in the present invention, e.g., a mobile device, a laptop, a home desktop, a tablet computer, or the like. Devices 202/204 may be exemplary embodiments of devices 106, 136, 134 or the like. The media server 200 may be located as a service available through internet 110, PSTN/cellular provider 130, on a device itself, in the IP telephony system 120 or the like.

During the course of the communications session between participant 201 and participant 203, the audio and, if applicable, video content of each participant passes through the carrier network 220 to the media server 200. For example, the video of participant 201 is transmitted from the device 204 to the media server 200 and then served to device 202 from the media server 200. The content recording processor 210 stores the video and audio content. The content recording processor 210 may store video and audio content in a database 250 or other form of storage, either local or remote from the media server 200. The media server also accepts requests for content playback from various devices. For instances, participant 203 may request to view a portion of the communications session that took place 5 minutes ago. Such a request may be packaged in a Session Initiation Protocol (SIP) message, extensible messaging and presence protocol (XMPP), hyper-text transfer protocol (HTTP), or the like, and submitted to the media server 200. In some embodiments, a soft port is opened on the media server 200 which accepts control requests. A soft port may be a non-physical software port of a server which is open to accepting control requests; those of ordinary skill in the art will understand the usage of soft ports. The content request processor 212 accepts the control request and directs the content recording processor 210 to retrieve video meeting the control request parameters and transmit the content back to the requesting device. The requests may be in the form of a user input, such as for example, sliding a video/audio playback slider object of a video player to a specific time, and the like, as describe below in further detail with respect to the user interface of FIG. 3.

According to other embodiments, the video feed of participant 203 from device 204 may be directly transmitted to device 202, where device 202 stores the video and audio content in local storage 218. Similarly, the device 204 stores audio and video content of participant 201 in local storage 214. In some embodiments, device 202 and 204 may store video and audio content in external storage 216. Although external storage 216 is depicted as being shared by both device 202 and 204, in some embodiments, each device may have a separate external storage 216.

The devices 202 and 204 may perform peer to peer video conferencing, where playback control of the content is controlled from one of the peers. For example, participant 203 and participant 201 are engaging in a communications session, which is being recorded to local storage 218. When participant 203 requests to rewind the communications session by five minutes, the request is transmitted to the device 202, which acts as a peer-to-peer media server, sending the requested portion of the content, or information associated with the location of the requested portion of the content, to the device 204.

Those of ordinary skill in the art will recognize that the present invention may be expanded to include multiple participant audio and video conferences, where the media server 200 handles multiple requests/responses to different participants. The media server 200 can play back video or audio content during a communications session to any one of the participants of the conference call or all of the participants of the conference call, depending on the request received at the content request processor 212.

Figure 3:
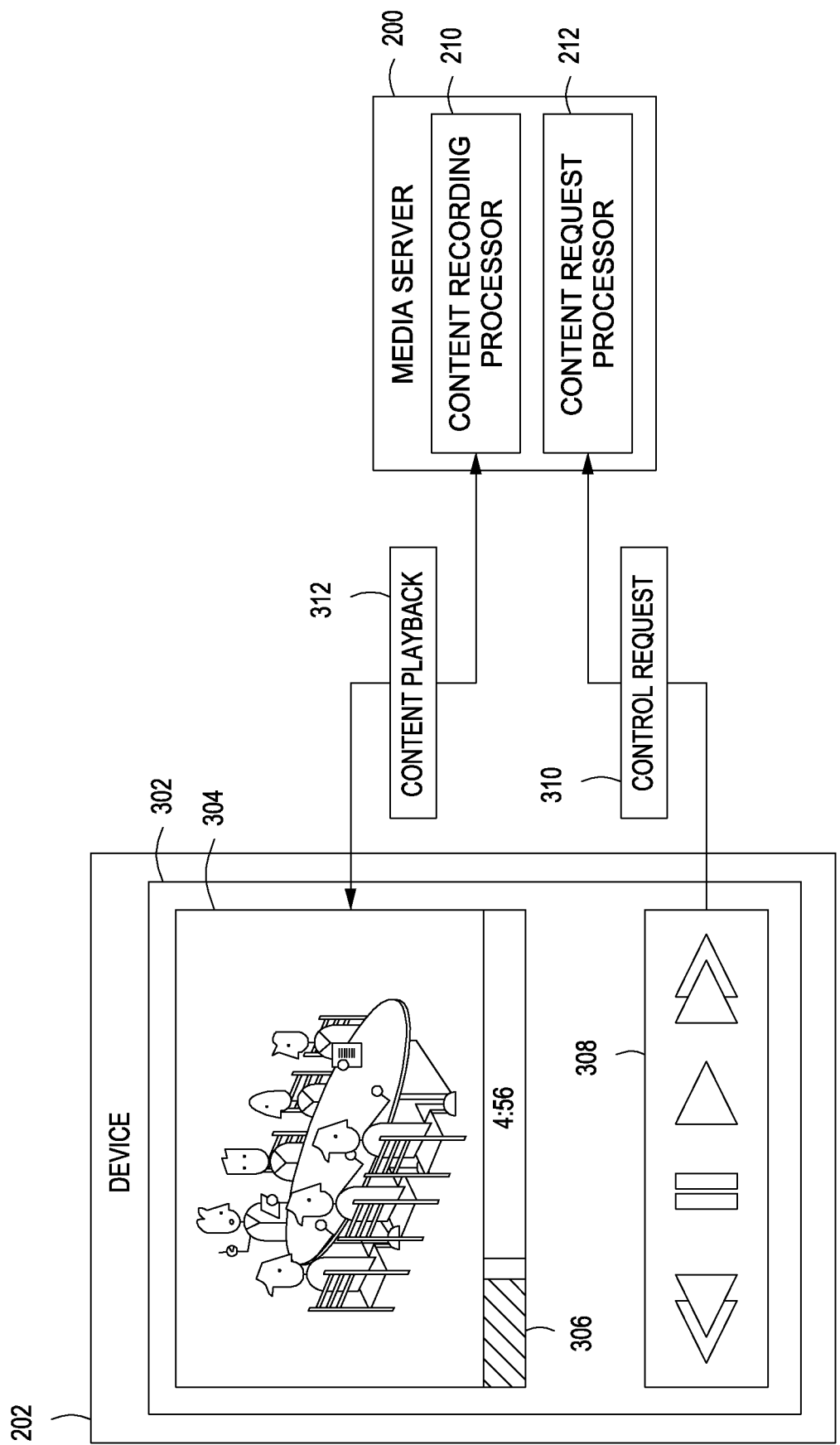
FIG. 3 is an illustration of a graphical user interface displayed on a device in accordance with exemplary embodiments of the present invention.

FIG. 3 is an illustration of a graphical user interface 302 displayed on device, such as for example device 202, in accordance with exemplary embodiments of the present invention. The interface 302 comprises a video content playback section 304, a playback slider 306 and a control section 308. In instances where a communications session comprises only audio content, the video content playback section 304 may be configured to display a visualization of the audio content, or to be empty. The content recording processor 210 will stream the content playback 312 of the video conference call to each participant engaged in the communications session. For example, the video content playback section 304 may include several tiled video streams displayed simultaneously; each recorded by the content recording processor 210 and transmitted by content recording processor 210. According to embodiments where the media server 200 is a remote server, the content playback 312 is transmitted via the carrier network 220. According to embodiments where the media server 200 is a local application running on device 202 or a peer device (e.g., device 204), the content playback 312 is retrieved from local or remote storage, and streamed either from the device 202 or a peer device.

The control section 308 enables a user to pause, rewind, play and forward video content from each participant independently. Alternatively, the controls in control section 308 can be configured to allow simultaneous playback of all video content from all participants, or simultaneous playback of the video content as well as live streaming of the video conference. Similarly, the playback slider 306 is also a control and may be used to rewind, forward and play a particular portion of the video content. Once a participant initiates a portion of the control section 308 or the playback slider 306, a control request 310 is transmitted to the content request processor 212. According to embodiments where the media server 200 is a remote server, the control request 310 is transmitted via the carrier network 220. According to embodiments where the media server 200 is a local application running on device 202, the control request 310 is a system call to the local application.

The control request 310 is received by the content request processor 212. The content request processor 212 processes the control request 310 to determine what the requested control is. The control request 310 may be in the form of a proprietary protocol, or may take the form of a SIP message, extensible messaging and presence protocol (XMPP) or hyper-text transfer protocol (HTTP). Those of ordinary skill in the art will understand that the control request 310 can be in the form of any suitable messaging protocol. The content request processor 212 parses the control request 310, based on the format, and determines which portion of the video and/or audio content to direct the content recording processor 210 to transmit to device 202.

For example, if the user engages the rewind button in the control section 308 for one second, the control request 310 will indicate that the video and/or audio content should be rewound 15 seconds and then transmitted to the device 202 and played in the video content playback section 304. If the participant requests to pause the video and/or audio content, the control request 310 will comprise pause instructions indicating that content playback 312 should be paused, and resumed when the participant presses the play or pause button. In some embodiments, a participant can select another participant's video content in the video content playback section 304 and then select a control from the control section 308. The control request 310 stores an identifier for which participant's video and/or audio content should be controlled. Accordingly, the content recording processor 210 will deliver the content playback 312 and perform whatever control function the user requested on only the selected participant.

According to one embodiment, while the playback is occurring, the teleconference/participant communications session continues in real-time. The content playback 312 is from an earlier portion of the current communications session. While the content playback 312 is replaying, participants in the communications session can continue to communicate with each other. In some instances, only the audio, or only the video is played back as the content playback 312. In other instances, both audio and video portions of the communications session may comprise the content playback 312. Those of ordinary skill in the art will recognize that the contents of content playback 312 may be an adjustable setting on the server side, predetermined based on user settings, or specified dynamically in the control request 310. While the audio and/or video portions are being played back, the audio and video of the communications session continues so that participants may continue to discuss the content playback 312 or other topics.

Figure 4:
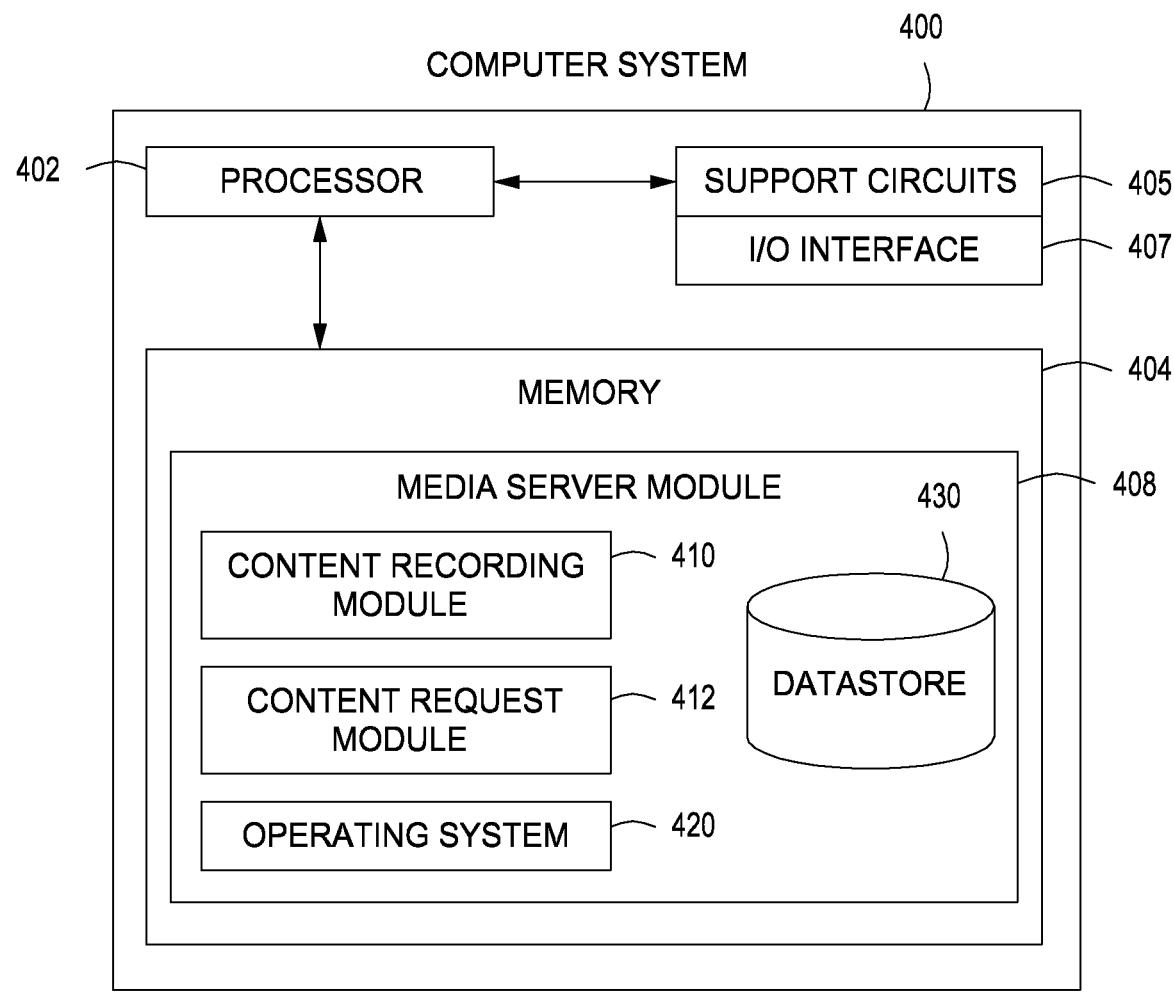
FIG. 4 is a block diagram of a computer system for implementing the media server as a software module in accordance with exemplary embodiments of the present invention.

FIG. 4 is a block diagram of a computer system for implementing the group manager apparatus as a software module. The computer system 400 includes a processor 402, various support circuits 405, and memory 404. The processors 402 may include one or more microprocessors known in the art. The support circuits 405 for the processor 402 include a cache, power supplies, clock circuits, data registers, I/O interface 407, and the like. The I/O interface 407 may be directly coupled to the memory 404 or coupled through the support circuits 405. The I/O interface 407 may also be configured for communication with input devices and/or output devices such as network devices, various storage devices, mouse, keyboard, display, video and audio sensors and the like.

The memory 404, or computer readable medium, stores non-transient processor-executable instructions and/or data that may be executed by and/or used by the processor 402. These processor-executable instructions may comprise firmware, software, and the like, or some combination thereof. Modules having processor-executable instructions that are stored in the memory 404 comprise a media server module 408 and a datastore 430. The media server 408 further comprises a content recording module 410 and a content request module 412.

The computer system 400 may be programmed with one or more operating systems 420, which may include OS/2, Linux, SOLARIS, UNIX, HPUX, AIX, WINDOWS, 10S, and ANDROID among other known platforms.

The memory 404 may include one or more of the following: random access memory, read only memory, magneto-resistive read/write memory, optical read/write memory, cache memory, magnetic read/write memory, and the like, as well as signal-bearing media as described below.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Figure 5:
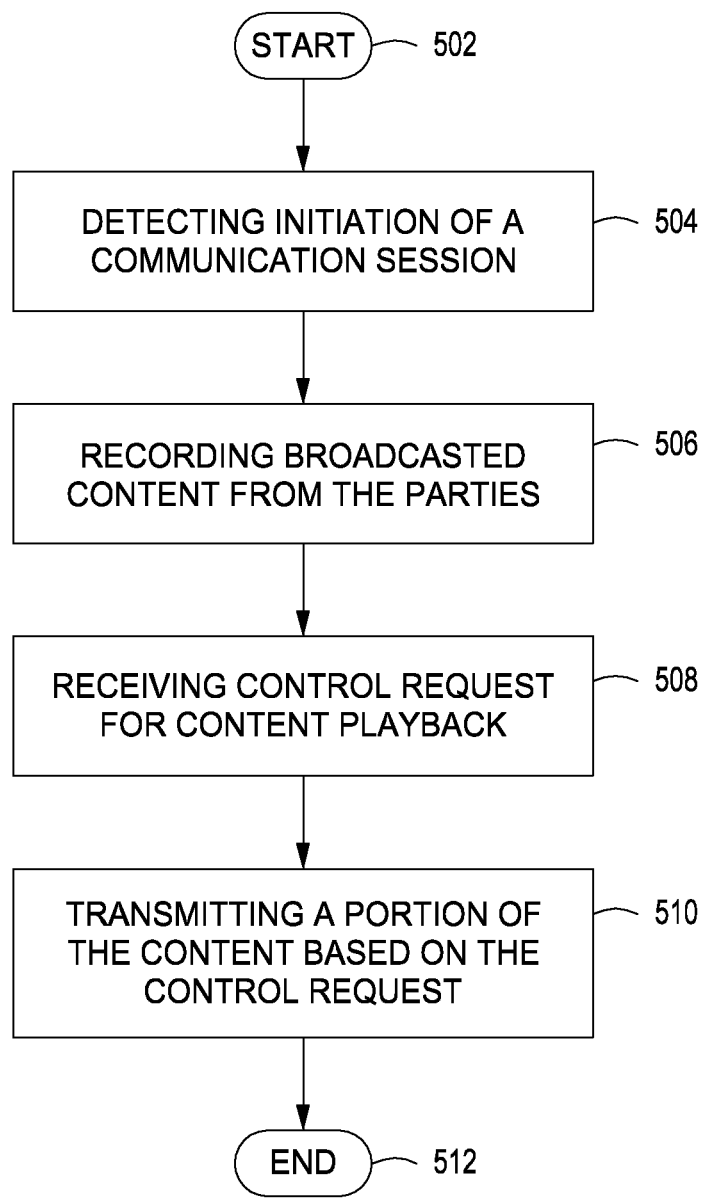
FIG. 5 is a flow diagram of a method for recalling and replaying content during a communications session in accordance with exemplary embodiments of the present invention.

FIG. 5 is a flow diagram of a method 500 for recalling and replaying content during a communications session in accordance with exemplary embodiments of the present invention. Method 500 illustrates an exemplary flow of the media server 408 stored in memory 404 and executed by the processor 402 of computer system 400.

The method begins at step 502 and proceeds to step 504. At step 502, the media sever 408 detects an initiating of a communications session between two or more participants. According to some embodiments, the communications session may be a standard telephone call between two participants, a video call between two participants, an audio/video conference between two or more participants, or the like. Those of ordinary skill in the art will recognize that the present application does not limit the type of communications session initiated.

At step 506, the content recording module 410 records the broadcasted content from each participant as a separate stream, for transmission to each other participant. According to some embodiments, the content is recorded locally and/or remotely. At step 508, the media server 408 receives a control request for content playback, during the communications session. The control request indicates which participant's content is being requested, and what portion of that content is being requested, for example, 10 minutes prior to the current time during the communications session. At step 510, the requested portion of content based on the control request is transmitted to the requesting participant via the content recording module 410. According to some embodiments, the content recording module 410 transmits the live participant broadcasts to each participant simultaneously with the recalled or played back portion of the content. The content may be audio and/or video content, in addition to content inserted into the communications session by one of the participants to the session.

While the foregoing is directed to embodiments of the present invention, other and further embodiments of the invention may be devised without departing from the basic scope thereof, and the scope thereof is determined by the claims that follow.

The invention claimed is:

1. A method for recalling and replaying content during a communications session comprising:
   detecting a real-time communications session comprising live broadcasted content between two or more participant devices;
   storing content of the communications session transmitted between the two or more participant devices as the real-time communications session persists;
   receiving a control request from a first participant device of the two or more participant devices to re-play a portion of the content, wherein the portion of the content comprises at least one of audio or video content of the communication session; and
   transmitting the portion of the content to all of the two or more participant devices as the live content of the real-time communications session continues to be stored and simultaneously displayed with the transmitted portion of the content, on all of the two or more participant devices.

2. The method of claim 1, wherein the communications session is one of an audio or video conference call.

3. The method of claim 1, wherein the portion of the broadcasted content is displayed while simultaneously displaying the live broadcasted content during the communications session.

4. The method of claim 1, wherein the control request comprises a participant identifier indicating which participant's broadcasted content to control.

5. The method of claim 1, wherein the method is executed as a software module on a participant device.

6. The method of claim 1, wherein the method is executed on a server remote from a participant device to which the portion of the content is transmitted.

7. A system for recalling and replaying content during a communications session comprising:
   a media server configured to record broadcasted content from two or more participant devices during a communications session, the media server comprising:
   a content recording processor configured to record the content to one of a remote storage or a local storage and configured to transmit the content to all of the two or more participant devices; and
   a content request processor configured to receive a control request from a first participant device comprising a request to re-play a portion of the communications session and configured to instruct the content recording processor to deliver the content to two or more of the participant devices, while continuing to deliver live content of the broadcasted content of the communication session to the two or more of the participant devices.

8. The system of claim 7, wherein the transmitted content comprises at least one of audio or video content.

9. The system of claim 7, wherein the communications session is one of an audio or video conference call.

10. The system of claim 7, wherein the control request comprises a participant identifier indicating which participant's broadcasted content to control.

11. A method for recalling and replaying content on a device comprising:
    displaying live broadcasted content, wherein the content is from a real-time communications session comprising live broadcasted content between two or more participant devices;
    transmitting a control request to recall a portion of the broadcasted content from one of the participant devices, wherein the broadcasted content comprises at least one of audio or video content of the communication session; and
    displaying the portion of the broadcasted content based on the control request to all of the two or more participant devices as the live content of the real-time communications session continues to be stored and simultaneously displayed with the requested or recalled portion of the content, on all of the two or more participant devices.

12. The method of claim 11, wherein the portion of the broadcasted content is displayed while simultaneously displaying the live broadcasted content during the communications session.

13. The method of claim 12, further comprising:
    receiving a control request from a peer participant device; and
    transmitting a portion of the content based on the control request received.

14. The method of claim 11, further comprising:
    displaying a graphical user interface to at least one participant, wherein the graphical user interface comprises a portion of broadcasted content from one of the participant devices.

15. The method of claim 14, wherein the graphical user interface comprises controls for controlling display of the portion of broadcasted content.

16. The method of claim 15, wherein the controls comprise a rewind control, a forward control, a pause control and a play control.

17. The method of claim 11, further comprising:
simultaneously displaying portions of video content from two or more participants; and
providing independent controls for each displayed portion of video content.

18. The method of claim 11, further comprising:
providing a playback slider enabling a participant to control playback of the portion of broadcasted content.

19. The method of claim 11, wherein the control request is in the form of a session initiation protocol (SIP) message, extensible messaging and presence protocol (XMPP) or hyper-text transfer protocol (HTTP).

* * * * *